United States Patent [19]
Hara et al.

[11] Patent Number: 5,709,179
[45] Date of Patent: Jan. 20, 1998

[54] ENGINE CYLINDER VALVE CONTROL SYSTEM

[75] Inventors: Seinosuke Hara; Akira Hidaka, both of Atsugi, Japan

[73] Assignee: Unisia Jecs Corporation, Atsugi, Japan

[21] Appl. No.: 751,694

[22] Filed: Nov. 18, 1996

Related U.S. Application Data

[62] Division of Ser. No. 313,868, Sep. 28, 1994, Pat. No. 5,592,908.

[30] Foreign Application Priority Data

Sep. 28, 1993 [JP] Japan ............................. 5-240834

[51] Int. Cl.⁶ .............................................. F01L 13/00
[52] U.S. Cl. ........................... 123/90.15; 123/90.17; 123/332
[58] Field of Search ................ 123/90.15, 90.16, 123/90.17, 90.31, 322, 333; 74/568 R

[56] References Cited

U.S. PATENT DOCUMENTS

| | | | |
|---|---|---|---|
| 3,633,555 | 1/1972 | Raggi | 123/90.17 |
| 4,856,465 | 8/1989 | Denz et al. | 123/90.17 |
| 4,909,195 | 3/1990 | Hasebe et al. | 123/90.16 |
| 4,917,057 | 4/1990 | Seki | 123/90.16 |
| 4,938,187 | 7/1990 | Seki | 123/90.16 |
| 4,942,853 | 7/1990 | Konno | 123/90.16 |
| 4,962,732 | 10/1990 | Inoue et al. | 123/90.16 |
| 5,009,203 | 4/1991 | Seki | 123/90.15 |
| 5,170,755 | 12/1992 | Kano et al. | 123/90.17 |
| 5,260,877 | 11/1993 | Drobny et al. | 364/431.11 |
| 5,333,579 | 8/1994 | Hara et al. | 123/90.17 |
| 5,365,896 | 11/1994 | Hara et al. | 123/90.17 |
| 5,417,191 | 5/1995 | Togai et al. | 123/333 |
| 5,557,983 | 9/1996 | Hara et al. | 74/568 |

FOREIGN PATENT DOCUMENTS

| | | |
|---|---|---|
| 43 02 246 | 7/1993 | Germany. |
| 1 311 562 | 3/1973 | United Kingdom. |
| 2 160 337 | 12/1985 | United Kingdom. |
| 2 165 885 | 4/1986 | United Kingdom. |
| 2 210 710 | 6/1989 | United Kingdom. |
| 2 215 487 | 9/1989 | United Kingdom. |
| 2 263 529 | 7/1993 | United Kingdom. |

OTHER PUBLICATIONS

Jahn, Siegfried, "Automation mit und ohne Elektronik", Albrecht Filler Verlag, Minden, Westfalia, 1959, p. 26.
"Nissan Laurel, Introduction to Model of the C34 Type", Nissan Motor Co., Ltd., Jan., 1993, pp. B–11, B–60–64, B–67–68, B–72, and B–77–82.

Primary Examiner—Weilun Lo
Attorney, Agent, or Firm—Foley & Lardner

[57] ABSTRACT

According to a control strategy, a cylinder valve control device is monitored and operation of the engine is modified. The cylinder valve control device includes a driving shaft driven by the engine to drive an intermediate member which in turn drives a cam arranged to open an engine intake valve, and a driver which is operative in response to a command to vary an amount of eccentricity of the intermediate member with respect to a shaft axis of the driving shaft. During one mode of engine operation, the intermediate member is supported in a support for rotation about an axis in eccentric condition with respect to the shaft axis to accelerate and decelerate the cam with respect to rotation of the driving shaft. During another mode of engine operation, the intermediate member is in concentric condition with respect to the shaft axis to provide a synchronous motion of the cam with rotation of the driving shaft. In response to the eccentricity of the intermediate member, the engine operation is modified.

2 Claims, 19 Drawing Sheets

5,709,179

ENGINE CYLINDER VALVE CONTROL SYSTEM

This application is a Divisional of application Ser. No. 08/313,868, filed Sep. 28, 1994 now U.S. Pat. No. 5,592,908.

BACKGROUND OF THE INVENTION

The present invention relates to an engine cylinder valve control and a system for controlling an internal combustion engine with such a cylinder valve control device.

U.S. Pat. No. 3,633,555 discloses an engine cylinder valve control device for moving a cam relative to its driving shaft. This device is applicable to an internal combustion engine to vary the movement of the cams which control the intake and/or exhaust valves of the engine. This known device comprises a drive member rotatable with a driving shaft, and an intermediate member mounted in an external bearing which is eccentric with respect to the shaft. The shaft extends through an opening in the intermediate member dimensioned to allow limited movement of the bearing to vary the eccentricity. A cam is coaxial with the shaft and rotatable relative thereto. The device includes a first coupling between the drive member and the intermediate member at a first position spaced from the shaft axis, and a second coupling between the intermediate member and the cam at a second position angularly spaced from the first position with respect to the shaft axis. The two couplings are so spaced from the shaft axis that they are at varying distances from the axis of the intermediate member during operation. Each of these couplings has a movable connection with the intermediate member to permit the variation in its distance from the axis of the intermediate member.

An object of the present invention is to improve a control strategy for an internal combustion engine with a cylinder valve control device such that information as to operation of the cylinder control device is used in advantageous manner in controlling the engine.

SUMMARY OF THE INVENTION

According to one aspect of the present invention, there is provided an engine cylinder valve control device for an internal combustion engine, comprising:

a driving shaft rotatable about a shaft axis;

a cam, adapted for actuating a cylinder valve, rotatable relative to said driving shaft;

a support;

an intermediate member supported in said support for rotation about an axis;

a first coupling between said driving shaft said intermediate member at a first position spaced from said shaft axis;

a second coupling between said intermediate member and said cam at a second position angularly spaced from said first position with respect to said shaft axis, said first and second couplings being so spaced from said shaft axis that they are at varying distances from said axis of said intermediate member during operation, each of said first and second couplings having a movable connection to permit the variation in its distances from said axis of said intermediate member;

a driver drivingly connected to said support for varying the eccentricity of said intermediate member, a sensor arranged to detect an amount of the eccentricity of said intermediate member and generate a sensor output representative of the amount of eccentricity;

means for generating a signal indicative of an engine speed of the internal combustion engine;

means for controlling said driver, said controlling means being operative responsive to said sensor output and said engine speed indicative signal to modify operation of the internal combustion engine.

According to another aspect of the present invention, there is provided a method of controlling an internal combustion engine with a cylinder valve control device, the cylinder valve control device including a driving shaft driven by the engine to drive an intermediate member which in turn drives a cam arranged to open an engine cylinder valve, and a driver which is operative in response to a command to vary an amount of eccentricity of the intermediate member with respect to a shaft axis of the driving shaft, the intermediate member being supported in a support for rotation about an axis in eccentric condition to accelerate and decelerate the cam with respect to rotation of the driving shaft during engine operation, the intermediate member being in concentric condition to provide a synchronous motion of the cam with rotation of the driving shaft during engine operation, the method comprising the steps of:

providing an output distinguishing an operation of the intermediate member in eccentric condition from an operation of the intermediate member in concentric condition; and suspending, responsive to said output, fuel supply to the internal combustion engine upon the engine speed exceeding a predetermined engine speed when said output represents the operation of the intermediate member in eccentric condition.

According to still another aspect of the present invention, there is provided a method of controlling an internal combustion engine with a cylinder valve control device, the cylinder valve control device including a driving shaft driven by the engine to drive an intermediate member which in turn drives a cam arranged to open an engine cylinder valve, and a driver which is operative in response to a command to vary an amount of eccentricity of the intermediate member with respect to a shaft axis of the driving shaft, the intermediate member being supported in a support for rotation about an axis in eccentric condition to accelerate and decelerate the cam with respect to rotation of the driving shaft during engine operation, the intermediate member being in concentric condition to provide a synchronous motion of the cam with rotation of the driving shaft during engine operation, the method comprising the steps of:

providing an output distinguishing an operation of the intermediate member in eccentric condition from an operation of the intermediate member in concentric condition;

suspending, responsive to said output, fuel supply to the internal combustion engine upon the engine speed exceeding a first predetermined engine speed when said output represents the operation of the intermediate member in eccentric condition; and increasing, responsive to said output, fuel supply to the internal combustion engine upon the engine speed dropping below a second predetermined engine speed that is lower than said first predetermined engine speed and an amount of load imposed on the internal combustion engine being less than a predetermined engine load value when said output represents the operation of said intermediate member in concentric condition.

3

Figure 2:
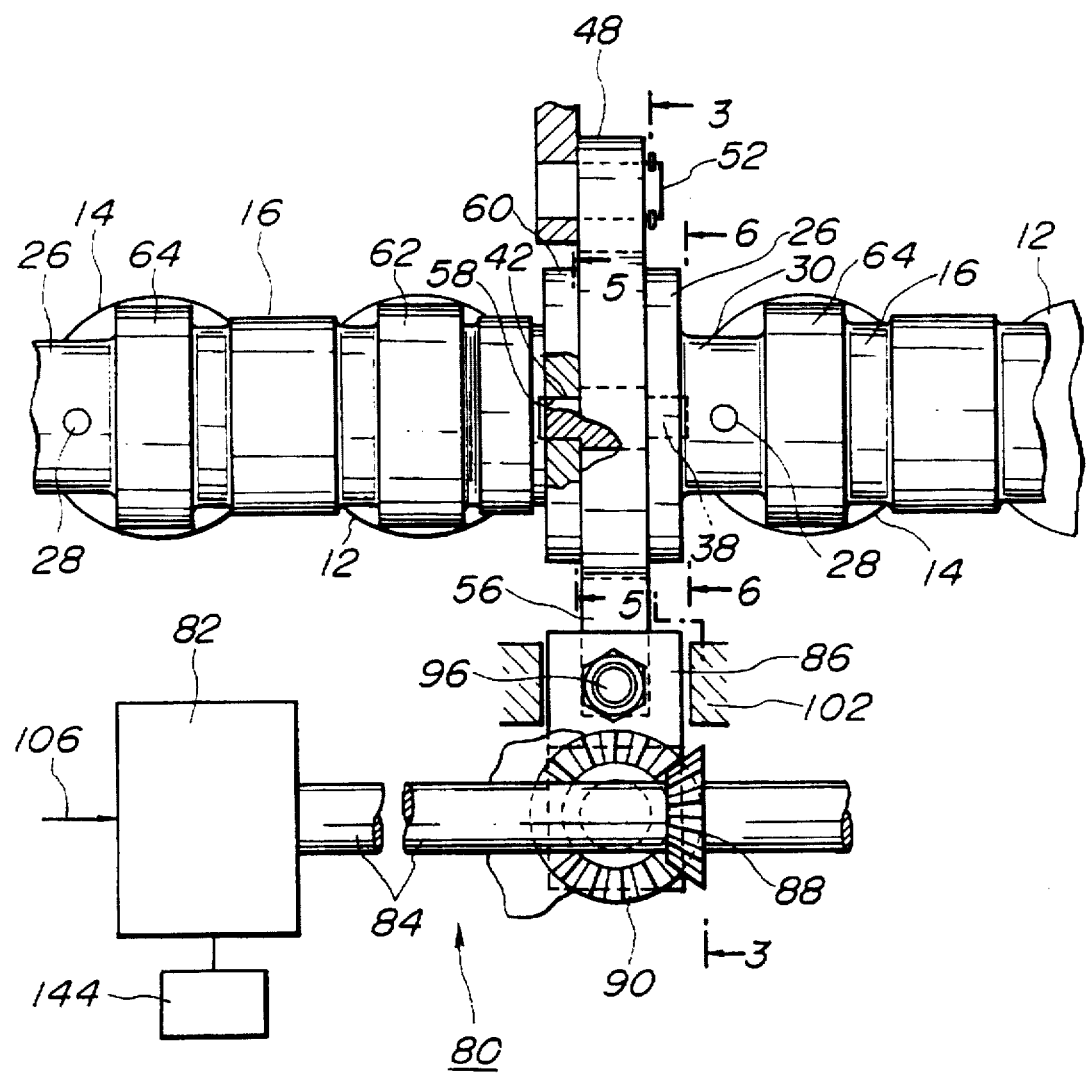
Figure 3:
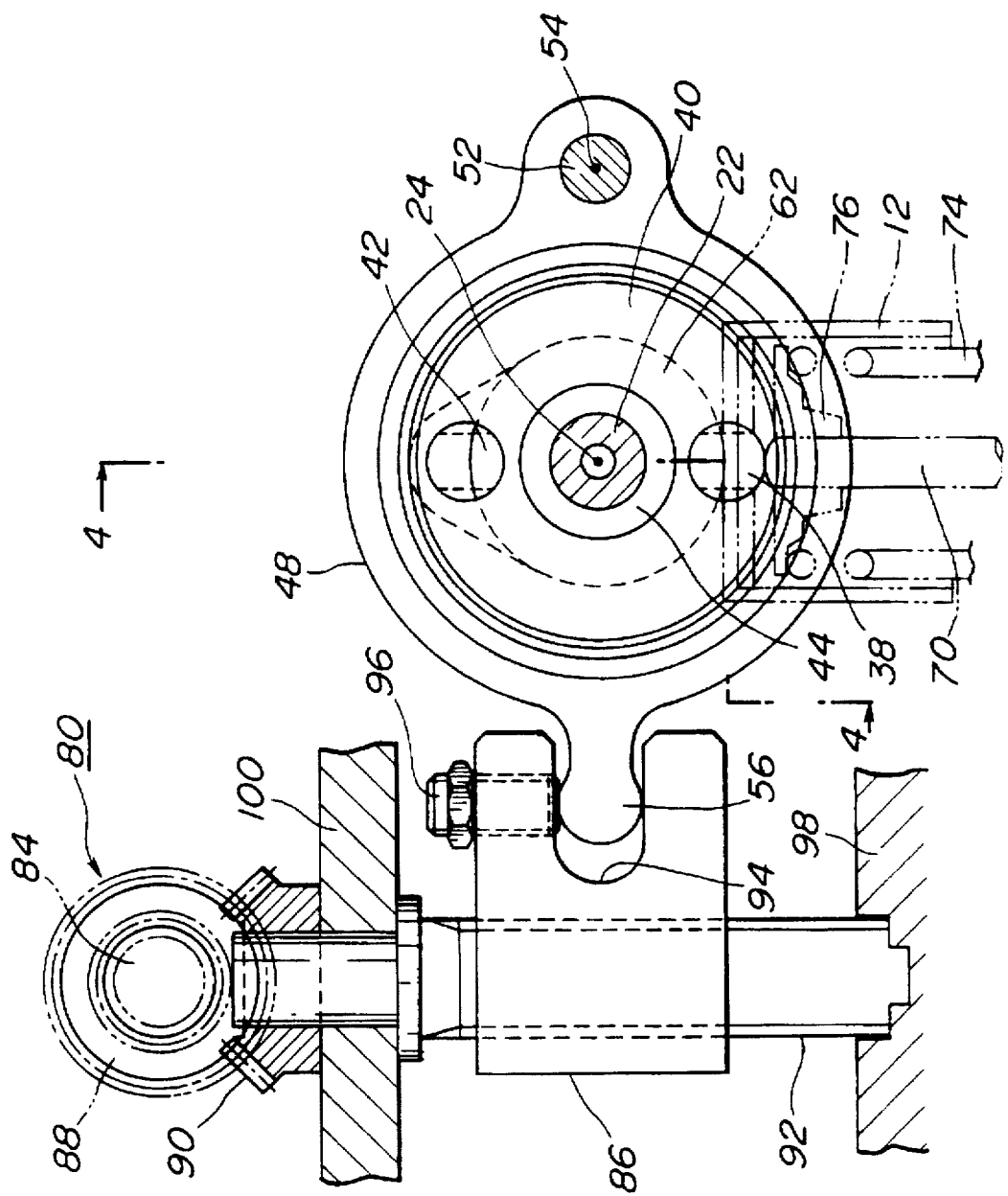
Figure 4:
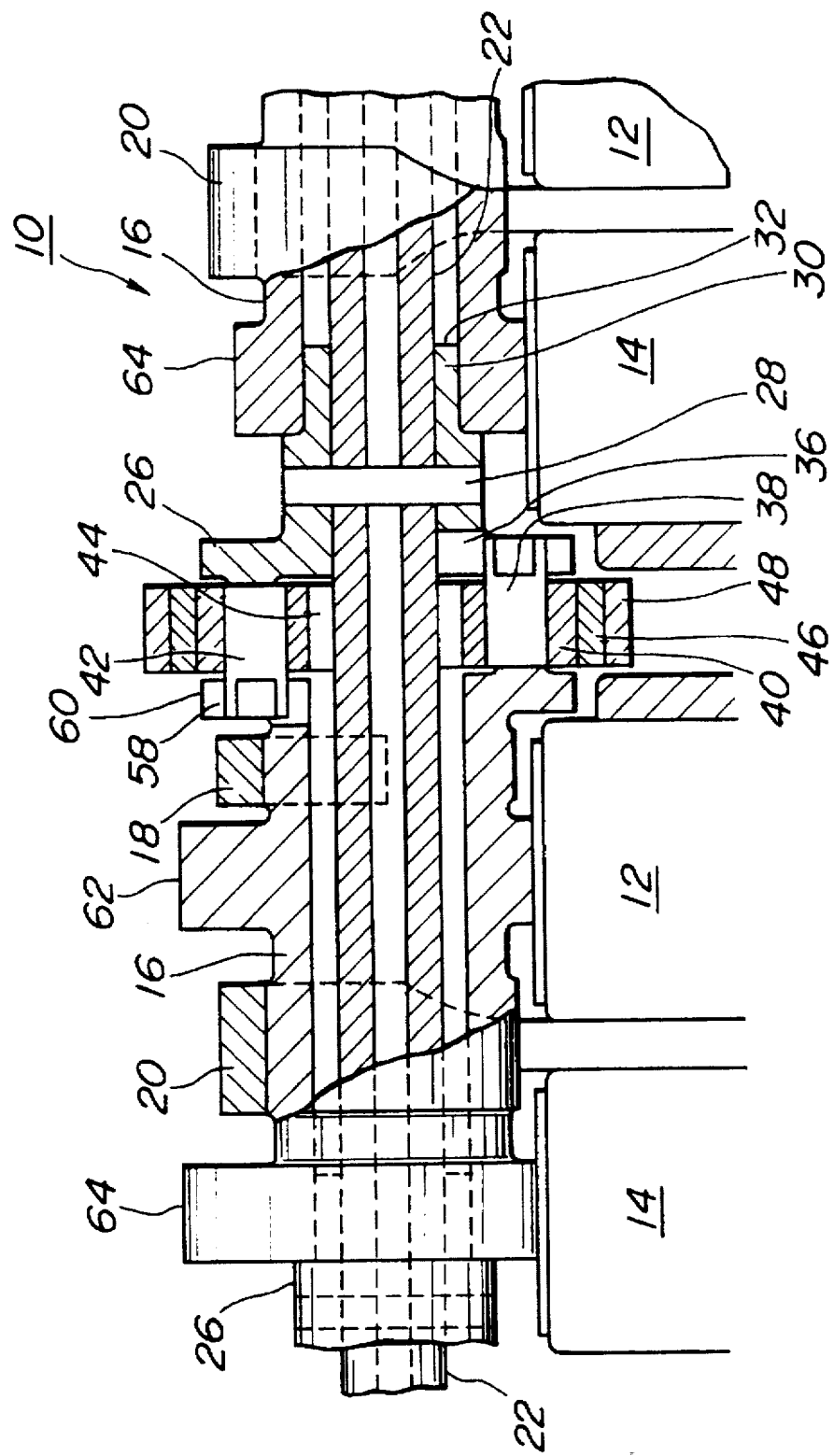
Figure 5:
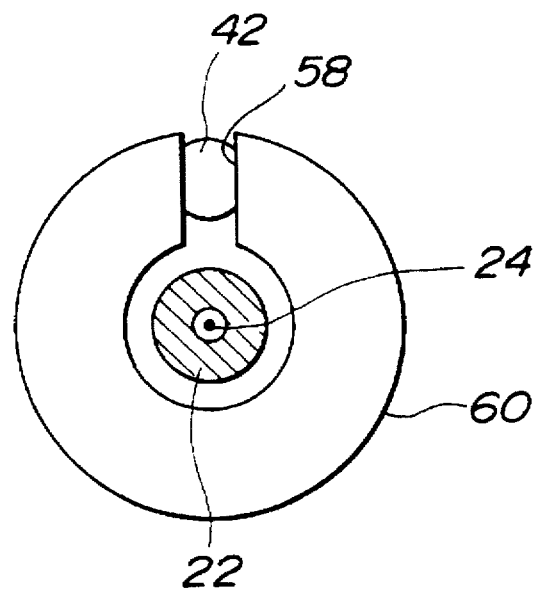
Figure 6:
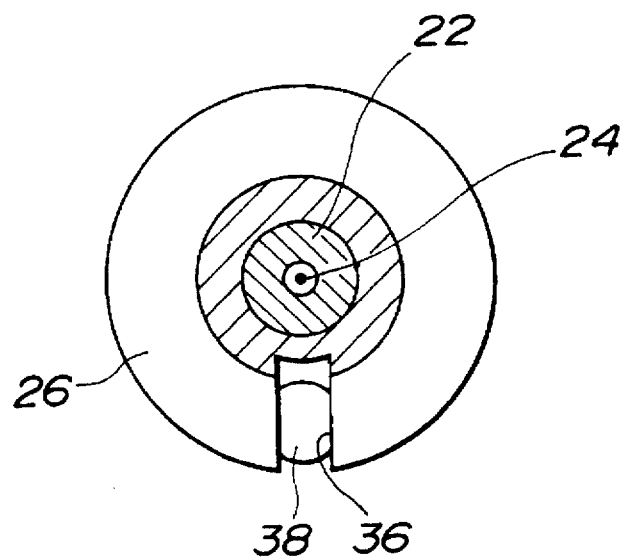
Figure 7:
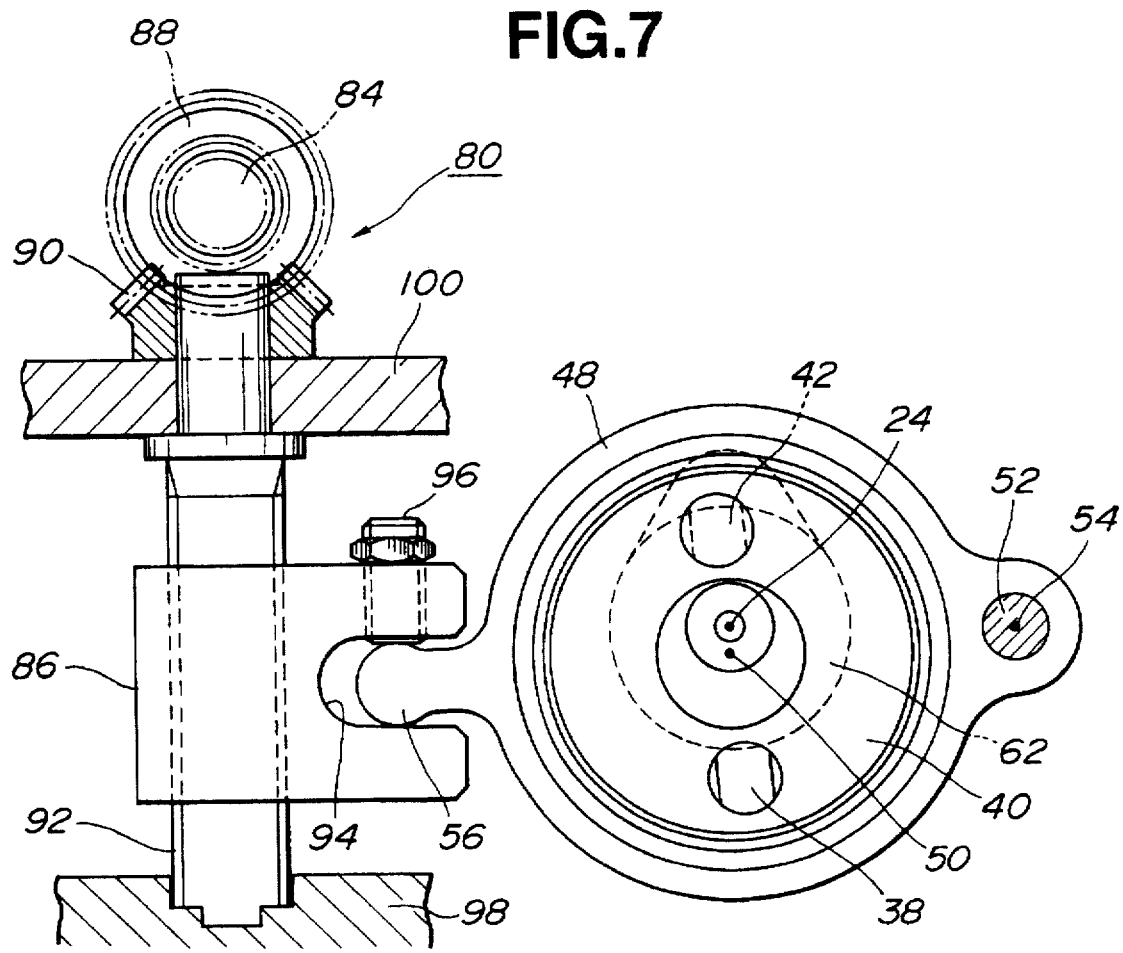
Figure 8:
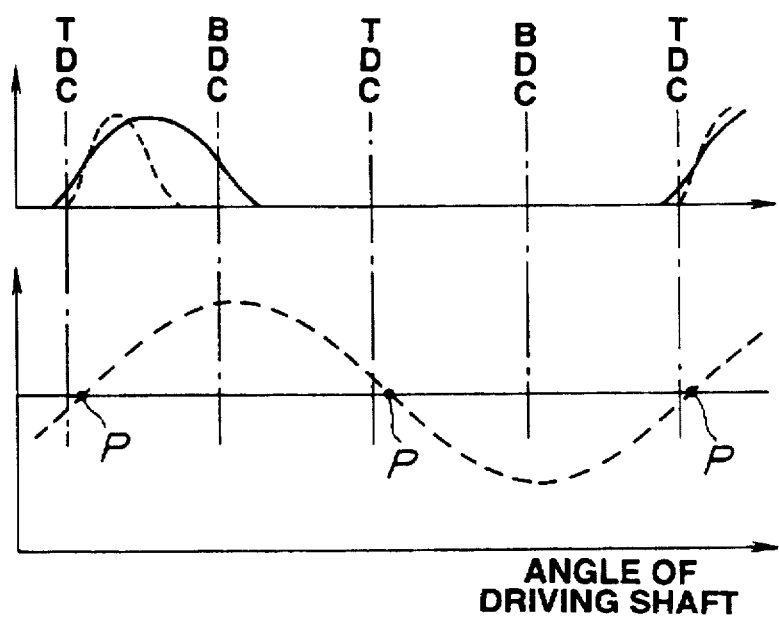
Figure 9:
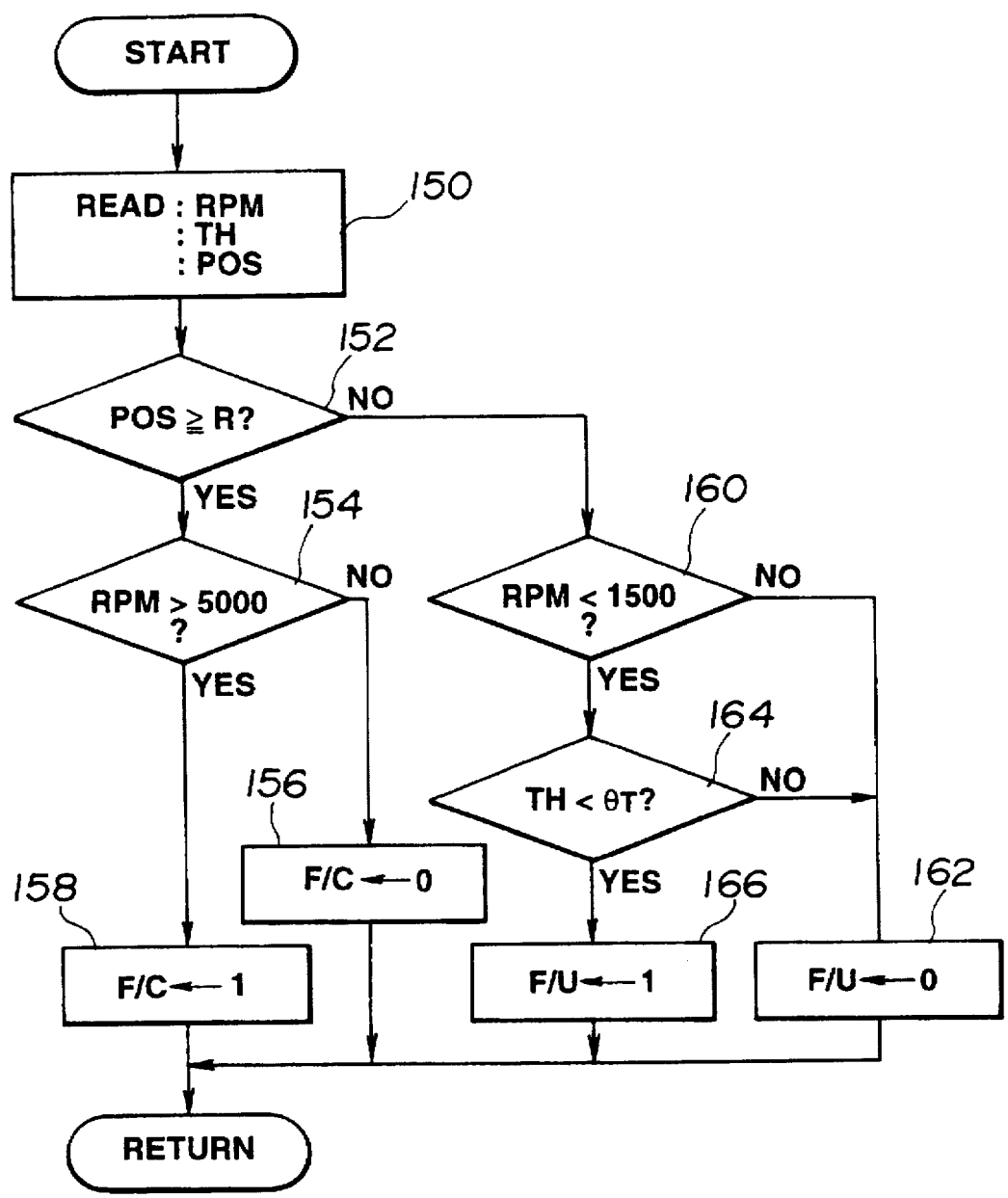
Figure 10:
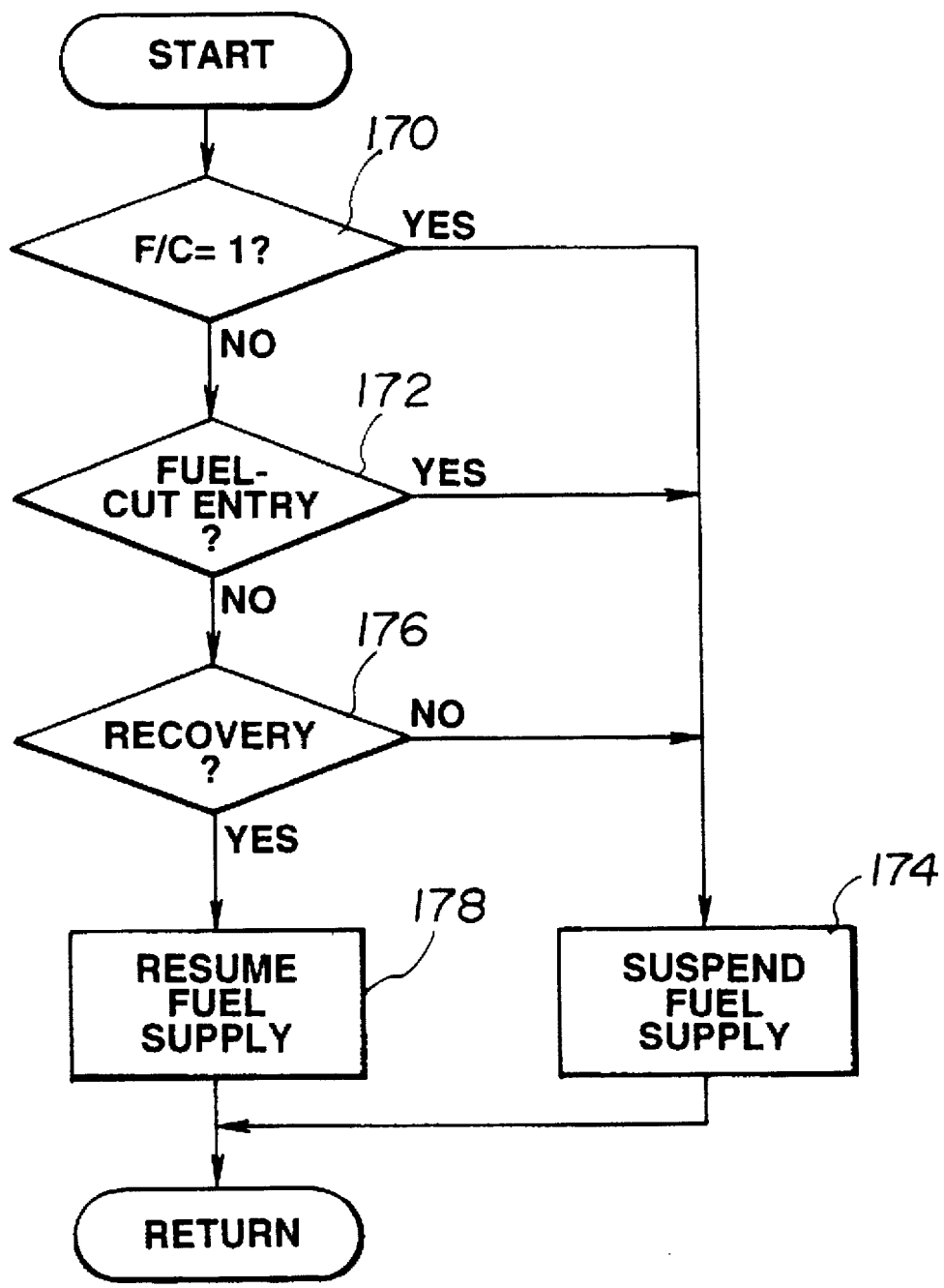
Figure 11:
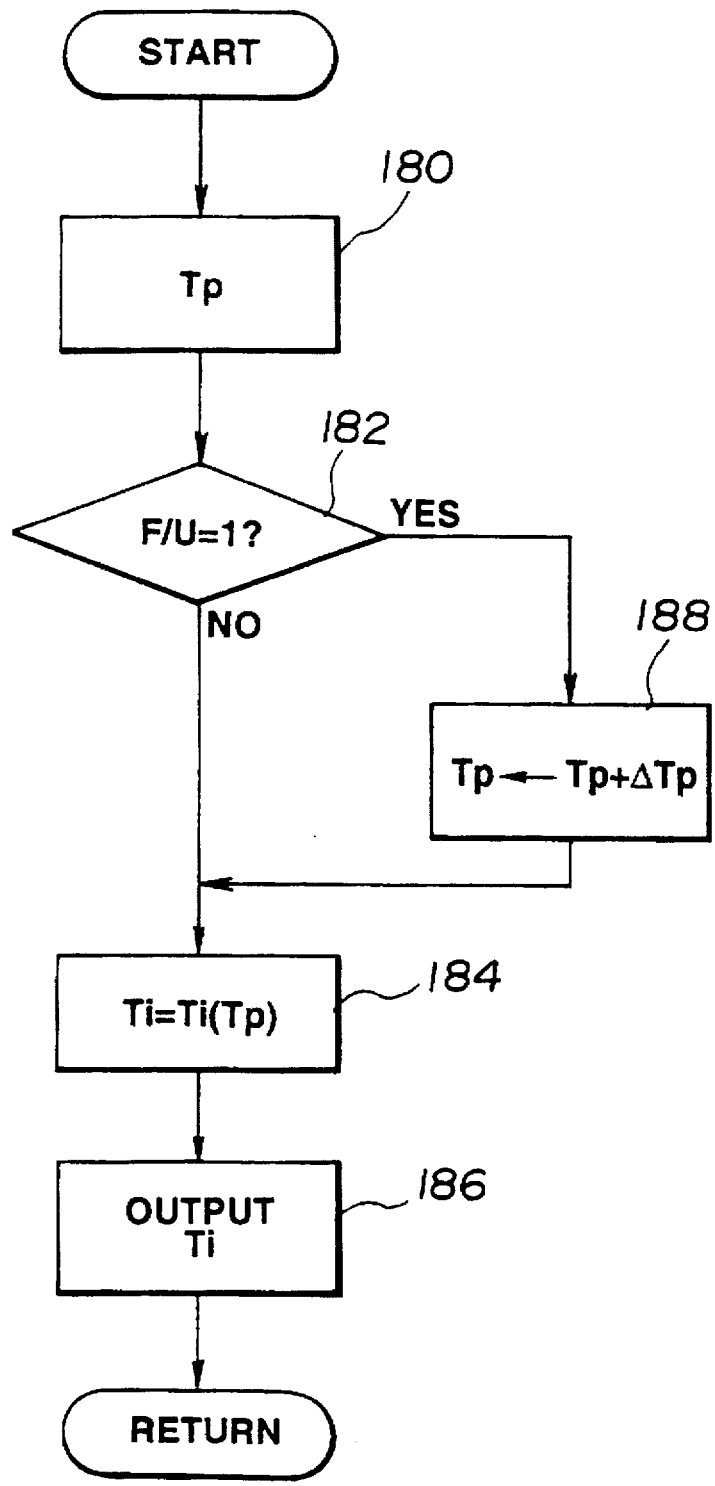
Figure 12:
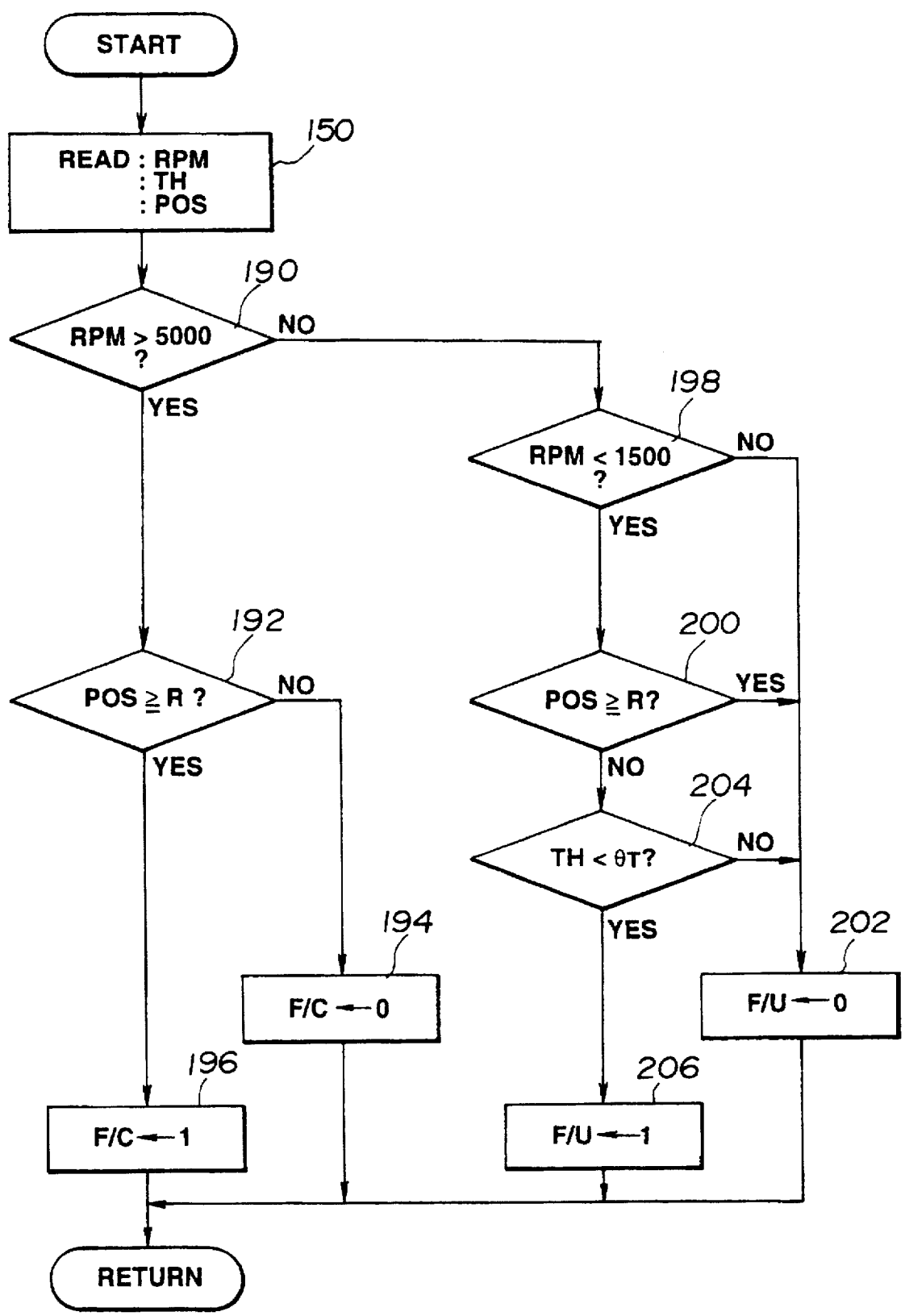
Figure 13:
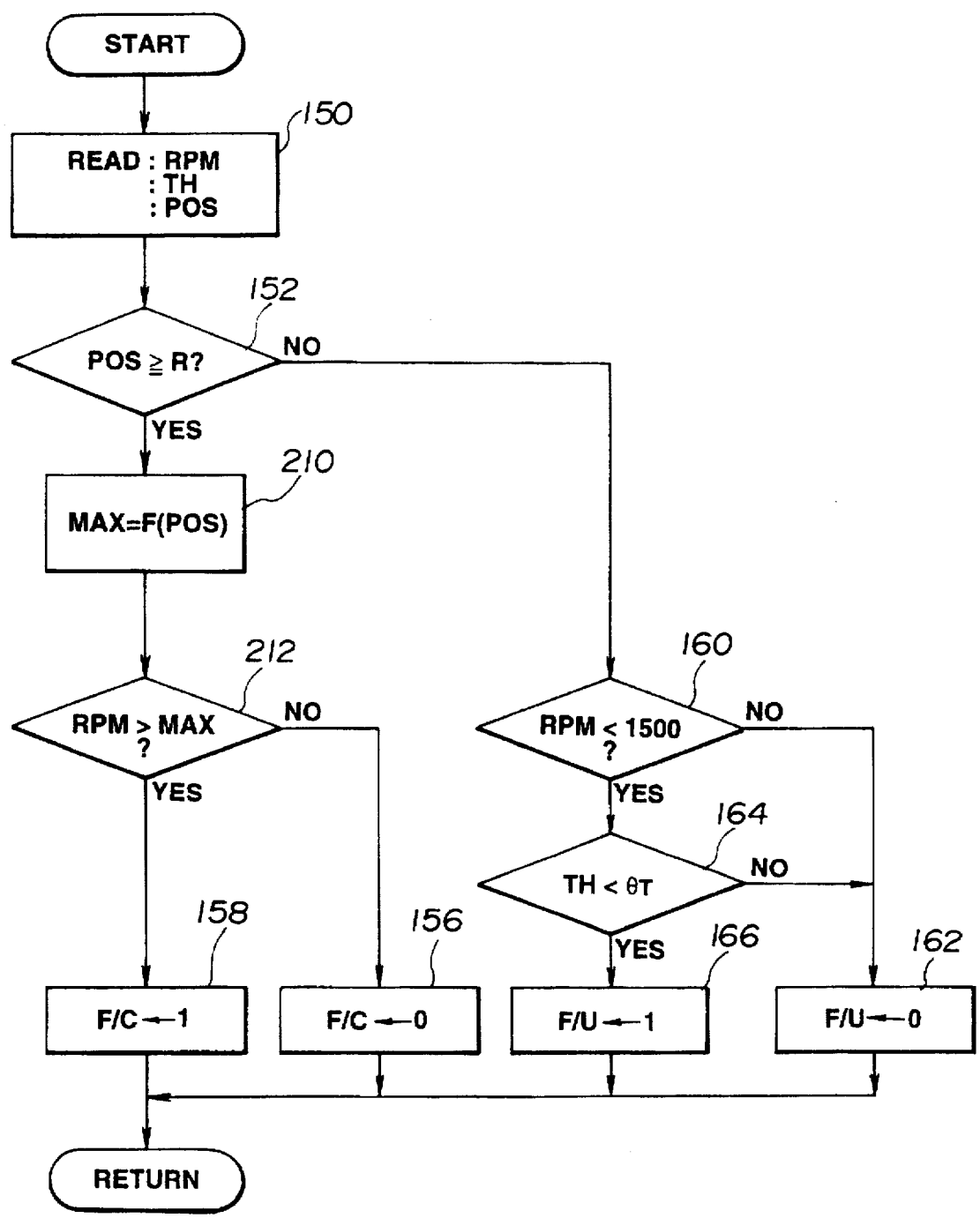
Figure 14:
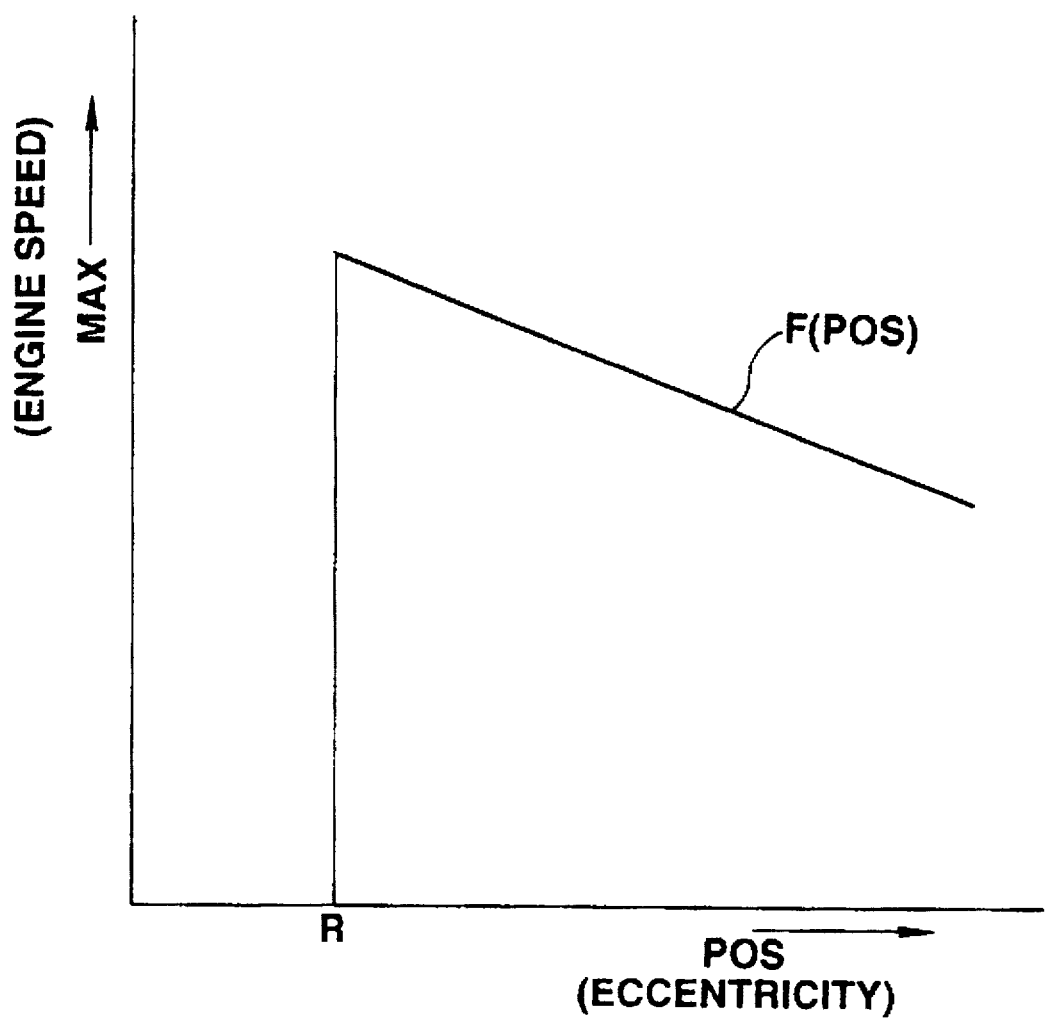
Figure 15:
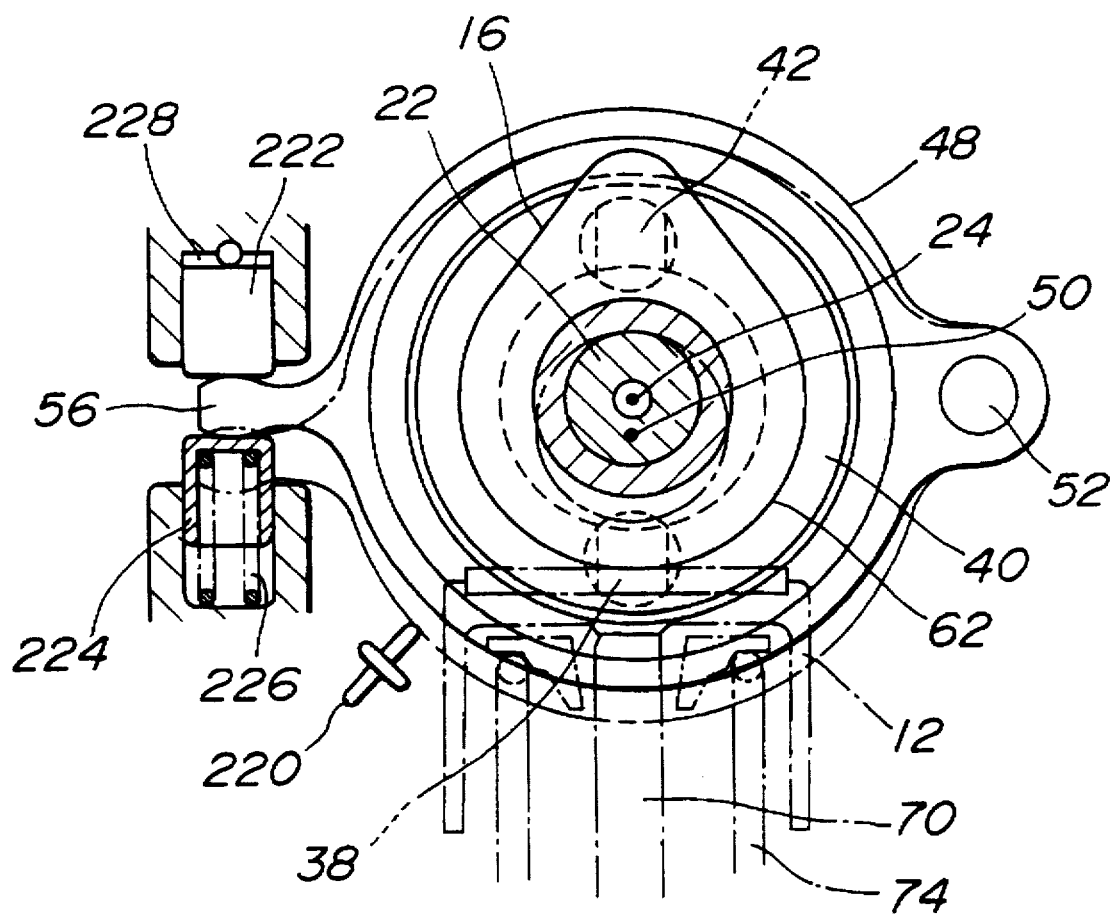
Figure 16:
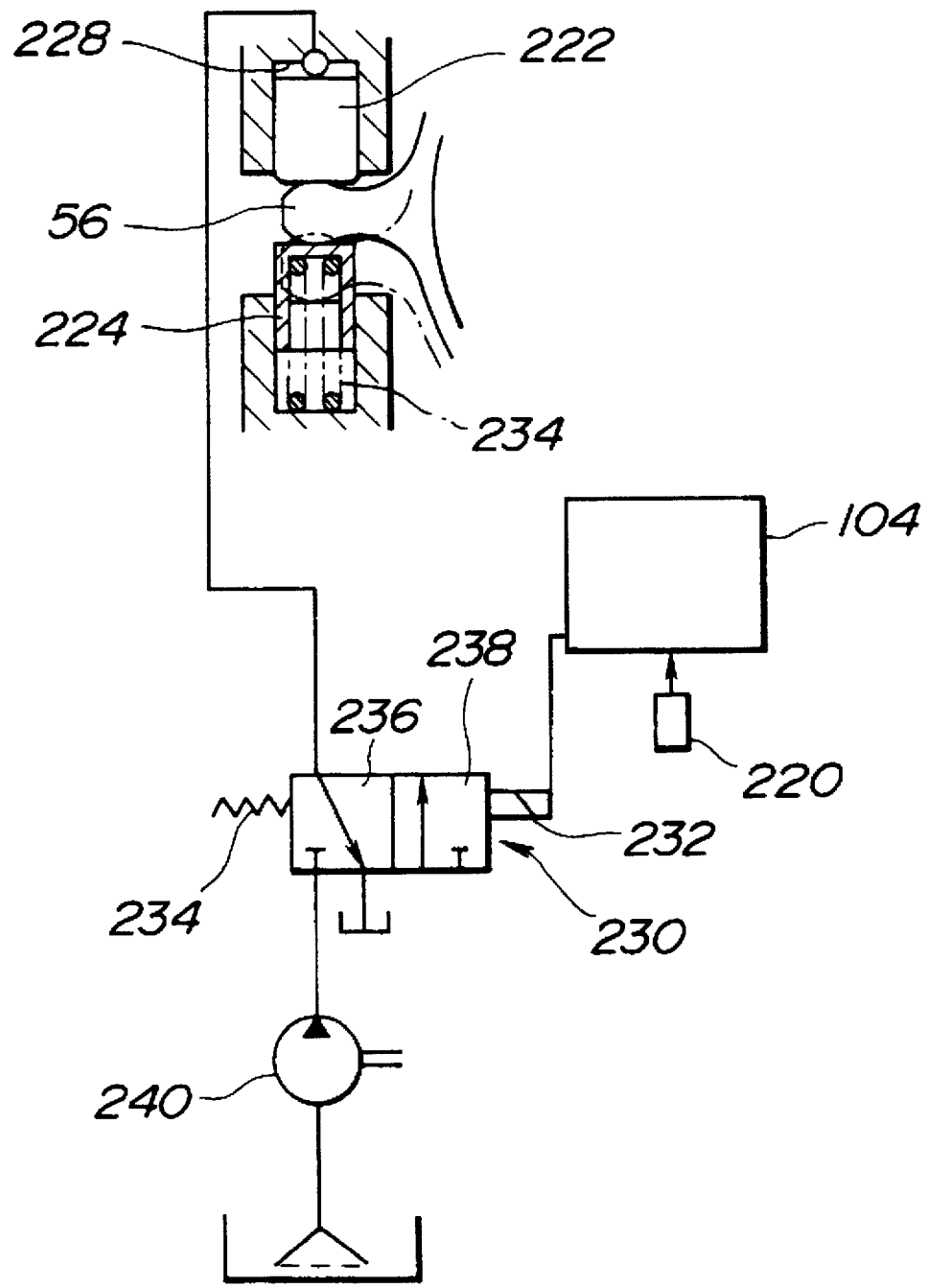
Figure 17:
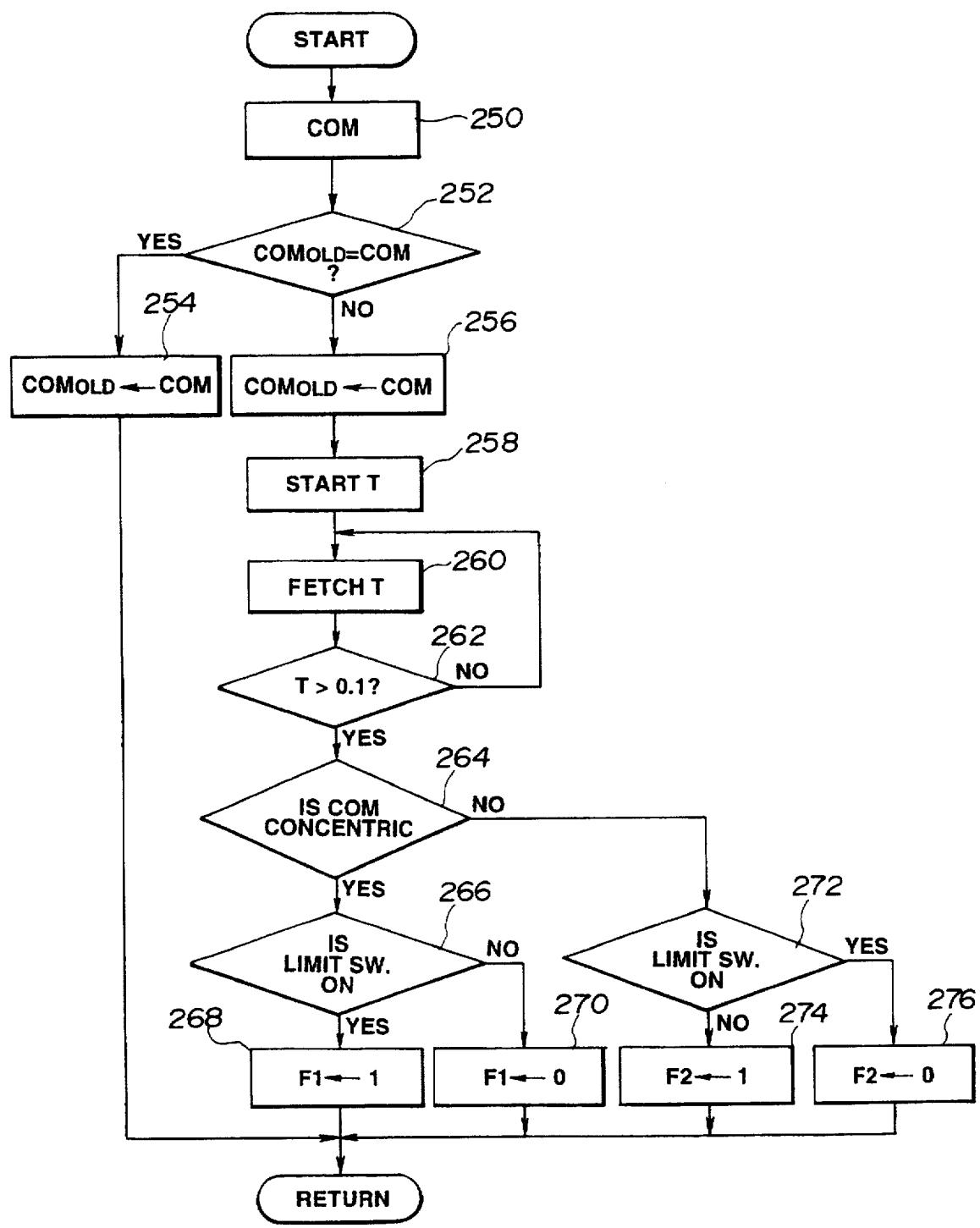
Figure 18:
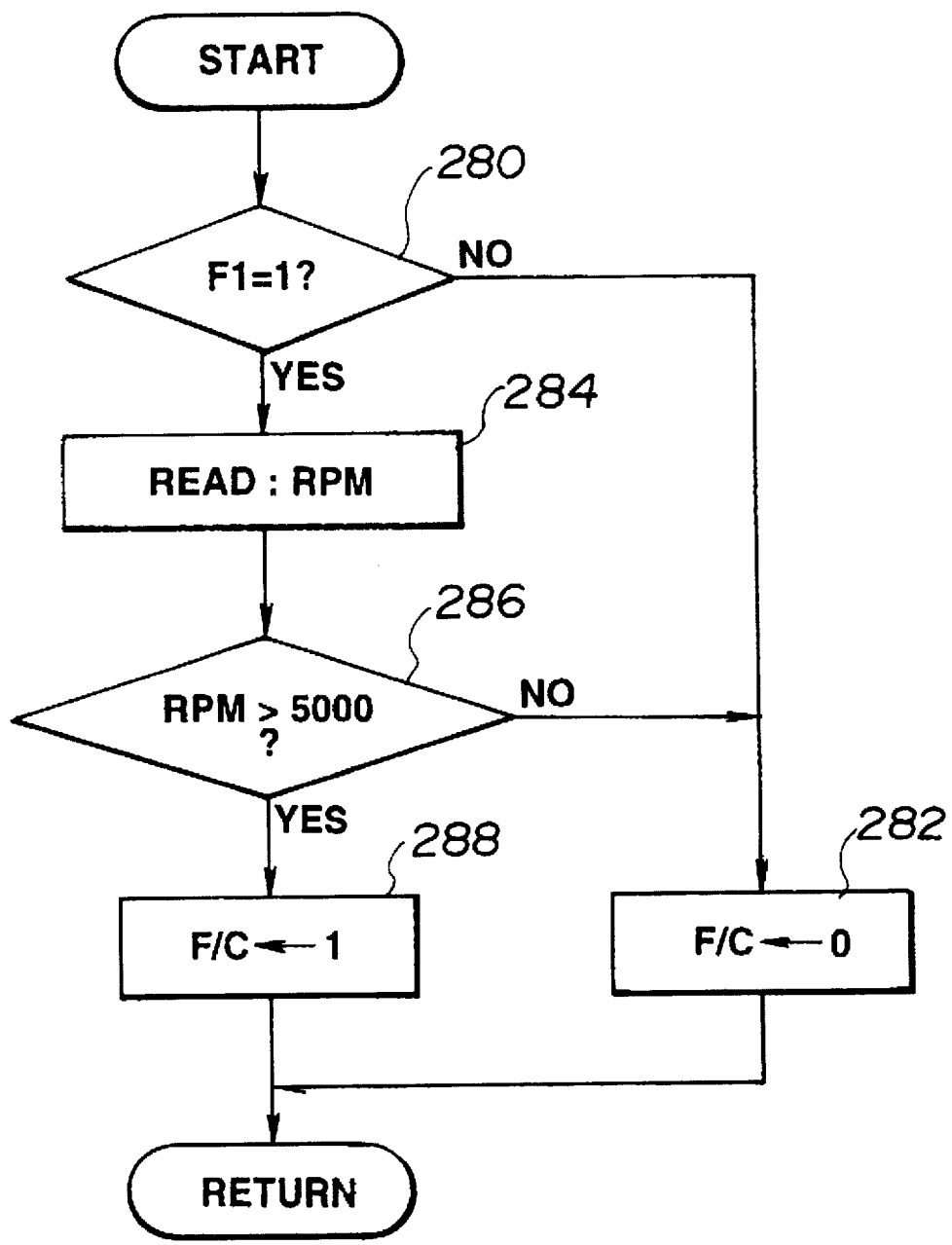
Figure 19:
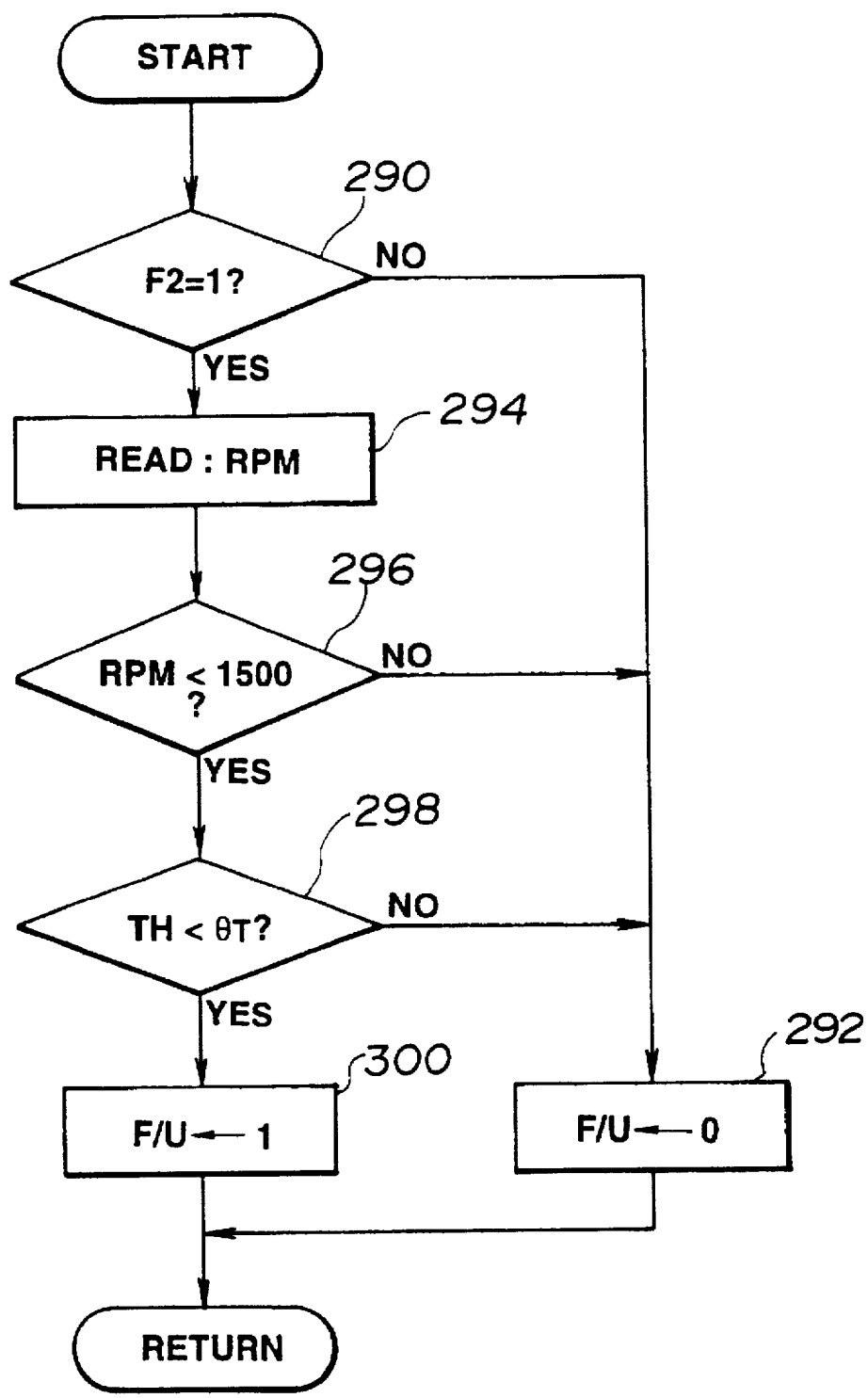
Figure 20:
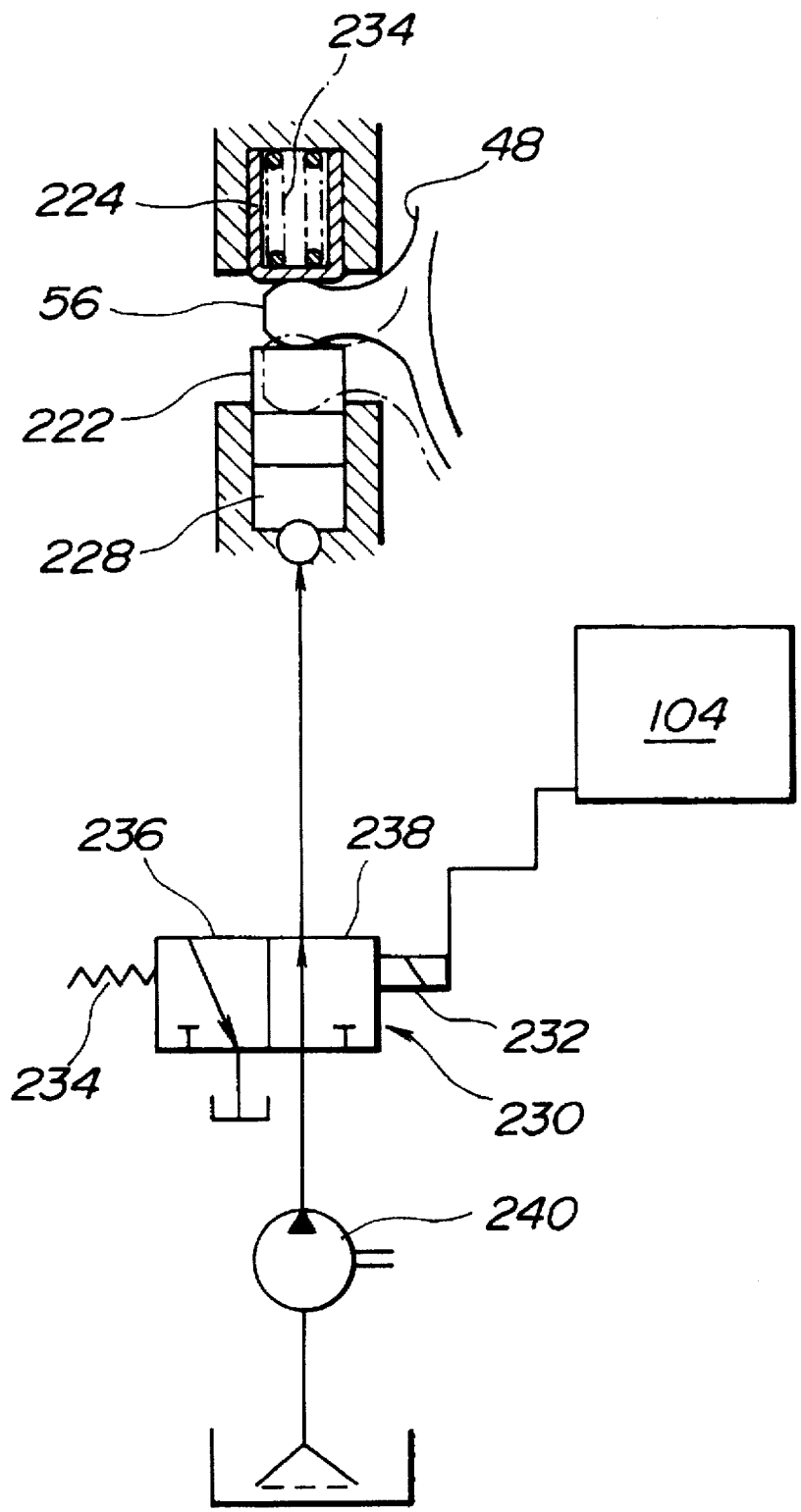

FIG. 2 is a fragmentary top plan view of the cylinder valve control device;

FIG. 3 is a section taken through the line 3—3 in FIG. 2, showing the position of parts when an intermediate member is in concentric condition;

FIG. 4 is a longitudinal section taken through the line 4—4 in FIG. 3;

FIG. 5 is a cross section taken through the line 5—5 in FIG. 2;

FIG. 6 is a cross section taken through the line 6—6 in FIG. 2;

FIG. 7 is a similar view to FIG. 3, showing the position of parts when the intermediate member is in an eccentric condition;

FIG. 8(A) shows, in dotted curve, variation of deviation in phase of a cam versus varying angle of a driving shaft when the intermediate member is in the eccentric condition, and, in fully drawn line, no deviation in phase of the cam versus varying angle of the driving shaft when the intermediate member is in a concentric condition;

FIG. 8(B) shows, in dotted curve, a valve lift diagram when the intermediate member is in the eccentric condition, and, in fully drawn line, a valve lift diagram when the intermediate member is in concentric condition;

FIG. 9, 10 and 11 are flow charts of a control strategy of the preferred implementation of the present invention;

FIG. 12 is a flow chart alternative to the flow chart of FIG. 9;

FIG. 13 is a flow chart alternative to the flow chart of FIG. 9;

FIG. 14 is a graphical representation of an allowable upper limit of engine speed versus varying amount of eccentricity of the intermediate member;

FIG. 15 is a similar view to FIG. 3 showing a portion of a modified cylinder valve control device;

FIG. 16 is a hydraulic diagram;

FIGS. 17, 18 and 19 are flow charts of a modified portion of the control strategy; and FIG. 20 is a similar view to FIG. 16 showing a modified hydraulic diagram.

DETAILED DESCRIPTION OF THE INVENTION

Figure 1:
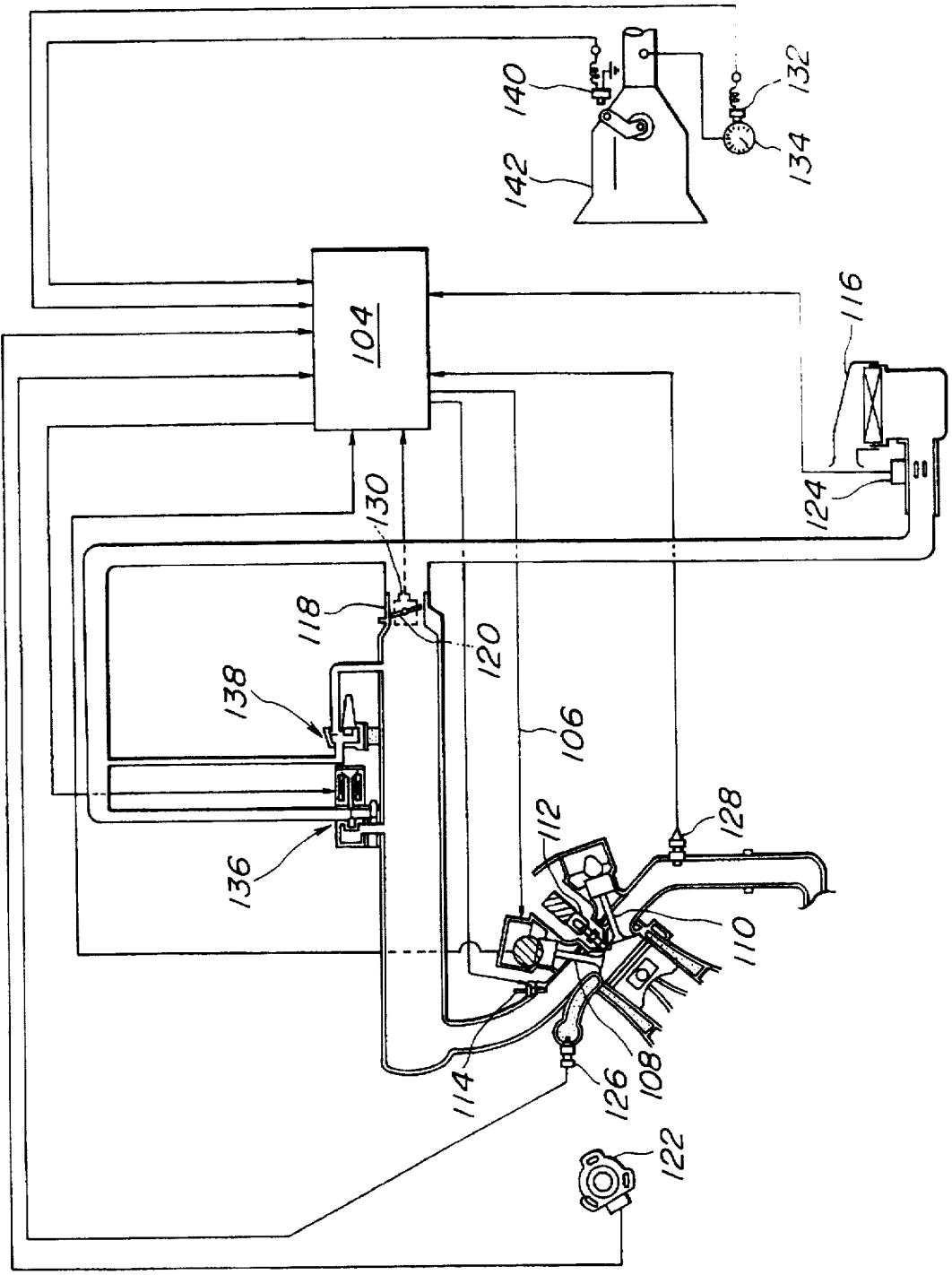
FIG. 1 is a block diagram of an engine control system with a cylinder valve control device.

FIG. 1 is a system for controlling an internal combustion engine with a cylinder valve control device 10 shown in FIGS. 2 through 6. The internal combustion engine is of the overhead camshaft type and has four cylinders in this embodiment with two intake valves per each cylinder. The cylinder valve control device 10 is designed to actuate the intake valves having tappets 12 and 14 (see FIG. 4).

Before explaining the engine controlling system shown in FIG. 1, the cylinder valve control device 10 is explained in connection with FIGS. 2 through 6.

Instead of a single conventional camshaft, the control device 10 uses four hollow double cams 16 arranged in line and rotatably supported by the engine cylinder head via cam brackets 18 and 20. Extending through all of the cams 16 is a driving shaft 22. The driving shaft 22 is supported within the cams 16 and rotatable about a shaft axis 24 by conventional means such as a toothed wheel and a chain. The driving shaft 22 has fixed thereto four drive members or collars 26 which drive the cams 16, respectively. As best seen in FIG. 4, the drive collar 26 is fixedly coupled with the driving shaft 22 by means of a cotter 28 and has a sleeve 30.

4

The sleeve 30 has a reduced diameter end portion 32 fit into the adjacent cam 16 and an annular shoulder 34 abutting the adjacent end of the cam 16. With the reduced diameter end portions 32 of the drive collars 26, the cams 16 are held in concentric relation with the driving shaft 22 for relative rotation thereto about the shaft axis 24. Mainly due to the annular shoulders 34, relative motion of the cams 16 in the direction of the shaft axis 24 is restricted.

As shown in FIGS. 2, 4 and 6, the drive collar 26 is formed with a radial slot 36 slidably engaged by a first pin 38 of an intermediate member in the form of an annular disc 40. The pin 38 is rotatably supported by the annular disc 40 and projects from one face of the disc 40 into the radial slot 36. Projecting from the opposite face of the annular disc 40 is a second pin 42 which is angularly spaced from the first pin 38 with respect to the shaft axis 24. In this embodiment, the second pin 42 is symmetrical to and angularly spaced through an angle of 180 degrees to the first pin 38.

The annular disc 40 has a central hole 44 and is fitted around the driving shaft 22 with ample radial clearance. The central hole 44 is wide so that the disc 40 does not touch the surface of the driving shaft 22 and is free to move into positions eccentric with respect to the driving shaft 22. The disc 40 is supported by a bearing 46 in a support or disc housing 48 for rotation about an axis 50 (see FIGS. 3 and 7). The disc housing 48 is rotatably supported by a shaft 52 fixed to a bracket mounted to the cylinder head and pivotal about an axis 54 parallel to the shaft axis 24. The disc housing 48 is annular and has a handle 56 angularly spaced from the shaft 52. Moving the handle 56 from the position shown in FIG. 7 to the position shown in FIG. 8 or vice versa causes the disc housing 48 and disc 40 to move in a plane perpendicular to the shaft axis 24.

The second pin 42 is rotatably supported by the disc 40 and slidably engages a radial slot 58 in a driven member or collar 60, forming an integral part and thus rotatable with the adjacent cam 16. The cam 16 has two cam lobes 62 and 64 for the tappets 12 and 14 of the cylinder valves.

As best seen in FIG. 3, the cylinder valve is of the poppet type having the tappet 12 and a stem portion 70. The cylinder valve is biased to a valve closed position by a spring 74 which reacts between the cylinder head structure (not shown) and a spring retainer 76.

Referring to FIG. 3, the support or disc housing 46 is moved by a driver 80. The driver 80 includes a motor in the form of a stepper motor 82 having a rotary output shaft 84. Rotary motion of the output shaft 84 is converted into linear motion of a non-rotative nut 86 by means of a bevel gear 88 fixed to the output shaft 84, a mating bevel gear 90 fixed to a power screw 92 which is threadedly engaged with the nut 86. The nut 86 has a mouth 94 receiving the handle 56 and a clearance adjustor 96 to hold the handle 56 in the mouth 94. The screw 92 is rotatably supported by a portion 98 of the engine cylinder head and a bracket 100 fixed to the engine cylinder head. As shown in FIG. 2, the nut 86 is non-rotatively supported by a guide 102 for a linear motion.

The stepper motor 82 is operatively coupled with an engine control unit 104 (see FIG. 1) via a line 106. The control unit 104 is operative to provide a concentric command or an eccentric command to the driver 80.

During engine operation at high speeds, the control unit 104 provides the concentric command to the stepper motor 82 and the driver 80 conditions the intermediate member or annular disc 40 in concentric condition with respect to the shaft axis 24. In other words, the support or disc housing 48 assumes the position shown in FIG. 3 wherein the axis 50 of the annular disc 40 agrees completely with the shaft axis 24 and loses its identity. Rotation of the cam 16 with two cam lobes 62 and 64 actuates the intake valves. The valve lift diagram, which is determined by the profile of the cam lobes 62 and 64, is illustrated by the fully drawn curve in FIG. 8(B). It is noted that, in concentric condition, the annular disc 40 provides a synchronous motion of the cam 16 with rotation of the driving shaft 22.

During engine operation at low speeds, the control unit 104 provides the eccentric command to the stepper motor 82. Upon a change in command from the concentric command to the eccentric command and vice versa, the stepper motor 82 turns the rotary output shaft 84, causing the nut 86 to move from the position shown in FIG. 3 to the position shown in FIG. 7 and vice versa.

At the position shown in FIG. 7, the disc housing 48 produces an eccentricity or an offset between the axis 50 of the annular disc 40 and the shaft axis 24. In other words, the intermediate member or annular disc 40 is in eccentric condition with respect to the shaft axis 24. Under this condition, the cam 16 is driven faster than the rotational speed of the driving shaft 22 over one part of the driving shaft revolution and then driven slower than the rotational speed of the driving shaft 22 over another part of the same revolution. The dotted line curve of FIG. 8A shows that the phase of the cam 16 advances over one part of the driving shaft revolution and then retards over another part of the same revolution. The dotted line curve in FIG. 8B shows a valve lift diagram of the intake valve in eccentric condition, while the fully drawn curve shows a valve lift diagram of the intake valve in concentric condition. Comparing the valve lift diagrams in FIG. 8B, it is seen that the valve opening duration in eccentric condition becomes shorter than the valve opening duration in concentric condition. This is because the annular disc 40 rotates about the axis 50 in eccentric condition to accelerate and decelerate the cam 16 with respect to rotation of the driving shaft 22.

Referring back to FIG. 1, the control unit 104 is further described. The cylinder valve control device 10 is fitted to actuate intake valves 108 of the internal combustion engine having exhaust valves 110, spark plugs 112 and fuel injectors 114. Intake air is supplied to the intake valves 108 via an air cleaner 116 past a throttle chamber 118 containing a throttle valve 120.

The control unit 104 is operative to determine and provides a fuel injection pulse to the fuel injectors 114 in response to information derived from a crank angle sensor 122, an air flow meter 124, a coolant temperature sensor 126, an oxygen ($O_2$) sensor 128, a throttle sensor 130 and a vehicle speed sensor 132. The crank angle sensor 122 is driven by an exhaust camshaft to detect a 1 degree signal and a 120 degrees signal and sends them to the control unit 104. The air flow meter 124 is of the hot wire type and outputs a voltage signal proportional to the air flow rate. The coolant temperature sensor 126 is mounted to detect temperature of engine coolant flowing adjacent the engine intake manifold and provides resistance which varies with coolant temperature. The $O_2$ sensor 128 is mounted to the engine exhaust manifold to provide output representative of oxygen concentration in the engine exhaust gases. The throttle sensor 130 is combined with a throttle switch having idle contacts. The vehicle speed sensor 132 provides pulse signals generated via a speed meter 134 to the control unit 104. The above mentioned sensors and meter 122, 124, 126, 128, 130 and 132 and the manner of determining the fuel injection pulse are described in Service Manual (C34-1) entitled "NISSAN LAUREL, INTRODUCTION TO MODEL OF THE C34 TYPE" published in January, 1993 by Nissan Motor Co. Ltd. Particular attention is paid to description and illustration related to a double overhead cam (DOHC) electronic fuel injection (EGI) engine of the RB25DE type on pages B-60 to B-64 of this Service Manual and to system components on pages B-76 to B-79 thereof.

Simply explaining, an amount of fuel injection Ti can be expressed by the following equation:

$$Ti = 2 \times Te + Ts \qquad \text{Eq 1}$$

where: Te represents an effective amount of fuel injection; and

Ts represents an amount for compensating for a delay of fuel injector owing to a drop in output voltage of vehicle battery.

The effective amount of fuel injection Te can be expressed by the following equation:

$$Te = Tp \times ALPHA \times K \times Co \qquad \text{Eq 2}$$

where: Tp represents a basic amount of fuel injection which is determined in response to intake air flow rate and engine speed detected by the air flow meter 124 and crank angle sensor 122;

ALPHA represents a coefficient for air fuel ratio feedback;

K represents a coefficient derived from air fuel ratio learning; and

Co represents various correction coefficients.

The control unit 104 is operative to perform a so-called "idle speed control" wherein, when the throttle valve is fully closed, the intake air is controlled by an auxiliary air control (AAC) valve 136 and an air regulator 138 in response to engine warming-up conditions and engine operating conditions. For this control, the control unit 104 receives informations from the crank angle sensor 122, coolant temperature sensor 126, throttle sensor 130 and vehicle speed sensor 132. The control unit 104 receives information from a neutral switch 140 mounted to an automatic transmission 142 driven by the engine. The AAC valve 136 and air regulator 138 are provided to control an auxiliary air bypassing the throttle valve 120. The air regulator 138 is of the bimetal type and has a heater to add heat to the auxiliary air upon supply of electric current. The supply of electric current is interrupted by the bimetal switch when the coolant temperature exceeds a predetermined value. The AAC valve 136 is a solenoid valve directly operated by the output of the control unit 104. This valve 136 is actuated in ON-OFF manner. The flow rate of auxiliary intake air is proportional to a ratio of ON duration to one cycle duration. The control unit 104 can vary this ON duration to control the flow rate of auxiliary intake air. The above mentioned AAC valve 136 and air regulator 138 and the manner of performing the idle speed control are described in the above-mentioned Service Manual (C34-1) entitled "NISSAN LAUREL, INTRODUCTION TO MODEL OF THE C34 TYPE." Particular attention is paid to description and illustration on pages B-67 and B-68 and pages B-80 and B-81 of the Service Manual.

Simply explaining, the control unit 104 effects a feedback control wherein the AAC valve 136 is operated to keep engine speed within a calibrated window around a target engine idle speed. This feedback control is initiated when the following first and second conditions are met and terminated when at least one of them fails to be met.

First Condition... the control unit 104 determines that the idle contacts of the throttle sensor 130 are closed;

Second Condition . . . the control unit 104 determines that the vehicle speed is below a predetermined speed, e.g., 8 km/h or the neutral switch 140 is turned "ON."

The control unit 104 is operative to determine whether the intermediate member or annular disc 40 is in eccentric condition or in concentric condition in response to information provided by a sensor in the form of a potentio meter 144 shown in block diagram in FIG. 2. The potentio meter 144 is arranged to detect a position taken by the rotary output shaft 84 and provides a position signal indicative of the detected position to the control unit 104. It is seen that the detected position represents an amount of eccentricity of the annular disc 40. Thus, it is considered that the potentio meter 144 detects the amount of eccentricity of the annular disc 40 and its sensor output in the form of the position signal is representative of the detected amount of eccentricity.

The flow charts of FIGS. 9, 10 and 11 illustrate a control strategy of the preferred implementation of the present invention. Execution of the control routine of FIG. 9 is repeated at regular intervals. At an input block 150, the control unit 104 inputs information of engine speed RPM, throttle valve position TH and output shaft 84 position POS based on the outputs of the crank angle sensor 122, throttle sensor 130 and potentio meter 144.

In a box 152, the control unit 104 determines whether POS is greater than or equal to a predetermined value R. If POS is greater than or equal to R, the control unit 104 determines that the annular disc 40 operated in eccentric condition, while if POS is less than R, it determines that the annular disc 40 operates in concentric condition.

If POS is greater than or equal to R in box 152, the control logic goes to a box 154 where the control unit 104 determines whether RPM is greater than a first predetermined engine speed of 5000, i.e., 5000 rpm. If RPM is less than or equal to 5000, the control unit 104 resets a flag F/C in a box 156. Then, the control logic returns to a point of START. If RPM is greater than 5000 in box 154, the control unit 104 sets the flag F/C in a box 158 before the control logic returns to the point of START.

In box 152, if POS is less than R, the control logic goes to a box 160 where the control unit 104 determines whether RPM is less than a second predetermined engine speed of 1500, i.e., 1500 rpm. If RPM is greater than or equal to 1500, the control unit 104 resets a flag F/U in a box 162. Then, the control logic returns to the point of START. If, in box 160, RPM is less than 1500, the control unit 104 determines, in a box 164, whether TH is less than a predetermined throttle position $\theta_T$. If TH is greater than or equal to $\theta_T$, the control logic goes to the box 162. If TH is less than $\theta_T$ in box 164, the control logic goes to a box 166 where the control unit 104 sets the flag F/U before returning to the point of START.

Execution of the flow chart of FIG. 10 is repeated at regular intervals. This simplified flow chart is intended to show in what manner the control unit 104 suspends fuel supply to the engine. In a box 170, the control unit 104 determines whether the flag F/C is set. If F/C is not set, the control logic goes to a block 172 where the control unit 104 determines whether predetermined fuel-cut entry conditions are met. If the fuel-cut entry conditions are met, the control logic goes to a box 174 where the control unit 104 issues a command for suspending fuel supply to the engine. If, in box 172, the fuel-cut entry conditions are not met, the control logic goes to a box 176 where the control unit 104 determines whether predetermined recovery conditions are met. If the predetermined recovery conditions are not met, the control logic goes to box 174. If, in box 176, the predetermined recovery conditions are met, the control logic goes to a box 178 where the control unit 104 issues a command for resuming supply of fuel to the engine.

In box 170, if the flag F/C is set, the control logic goes to box 174 and the control unit 104 issues the command for suspending fuel supply to the engine. The control logic returns to a point of START of this routine after box 174 or box 178.

The predetermined fuel-cut entry conditions and recovery conditions are described on pages B-63 and B-64 of the before-mentioned Service Manual (C34-1) entitled "NISSAN LAUREL, INTRODUCTION TO MODEL OF THE C34 TYPE."

From the preceding description along with the flow charts of FIGS. 9 and 10, it is seen that the control unit 104 is operative to suspend fuel supply to the engine upon the engine speed RPM exceeding the predetermined engine speed of 5000 rpm when the annular disc 40 operates in eccentric condition. It is readily appreciated that according to this control strategy, the engine speed is always held lower than an allowable upper limit for operation of the cylinder valve control device 10 with the annular disc 40 in eccentric condition.

Execution of the flow chart of FIG. 11 is repeated at regular intervals. At a box 180, the control unit 104 determines the basic fuel amount Tp by, for example, performing a table look-up operation. Then, the control logic goes to a block 182 where the control unit 104 determines whether the flag F/U is set. If, the flag F/U is not set, the control logic goes to a box 184 where the control unit 104 determines the amount of fuel injection Ti using the equation Eq 1. In a box 186, the control unit 104 outputs fuel injection pulse having a duration representing the amount Ti to the fuel injectors 114.

If, at box 182, the flag F/U is set, the control logic goes to a box 188 where the control unit 104 increases Tp by a unit amount delta Tp before the control logic goes to box 184. In this case, the increased amount of fuel injection Ti is supplied to the engine by the fuel injectors 114. The control logic returns to a point of START of this routine after box 186.

From the preceding description along with the flow charts of FIGS. 9 and 11, it is seen that the control unit 104 is operative to increase fuel supply to the engine upon the engine speed RPM dropping below the second predetermined engine speed of 1500 rpm and the throttle position TH being less than the predetermined throttle position $\theta_T$ when the annular disc 40 operates in concentric condition. It is readily appreciated that according to this control strategy, the engine speed is always held higher than an allowable lower limit for operation of the cylinder valve control device 10 with the annular disc 40 in concentric condition.

The flow chart of FIG. 9 may be replaced with an alternative flow chart of FIG. 12. In FIG. 12, after an input box 150, the logic flow goes to a box 190 where the control unit 104 determines whether RPM is greater than the first predetermined engine speed of 5000, i.e., 5000 rpm. If RPM is greater than 5000, the control logic goes to a box 192 where the control unit 104 determines whether POS is greater than or equal to the predetermined value R. If POS is greater than or equal to R, the control unit 104 determines that the annular disc 40 operates in eccentric condition. If POS is less than R, the control unit 104 determines that the annular disc 40 operates in concentric condition.

If, in box 192, POS is less than R, the control logic goes to a box 194 where the control unit 104 resets flag F/C before returning to a point of START. If, in box 192, POS is greater than or equal to R, the control logic goes to a box 196 where the control unit 104 sets flag F/C before returning to the point of START.

If, in box 190, RPM is less than 5000, the control logic goes to a box 198 where the control unit 104 determines whether RPM is less than a second predetermined engine speed of 1500, i.e., 1500 rpm. If POS is less than 1500, the control logic goes to a box 200 where the control unit 104 determines whether POS is greater than or equal to R. If POS is greater than or equal to R, the control logic goes to a box 202 where flag E/U is reset. If POS is less than R, the control logic goes to a box 204 where the control unit 104 determines whether TH is less than a predetermined engine load value of $\theta_T$. If TH is greater than or equal to $\theta_T$, the control logic goes to box 202 before returning to the point of START. If TH is less than $\theta_T$, the control logic goes to box 206 where the control unit 104 sets flag E/U before returning to the point of START. If, in box 198, RPM is greater than or equal to 1500, the control logic goes to the box 202 where flag E/U is reset before returning to the point of START.

FIG. 13 shows another alternative to the flow chart of FIG. 9. The flow chart of FIG. 13 is substantially the same as the flow chart of FIG. 9 except the addition of a box 210 disposed downstream of the box 152 and the addition of a box 212 in place of the box 154. FIG. 14 shows, in the fully drawn line, a set of values for the first predetermined engine speed. In FIG. 14, the vertical axis represents the first predetermined engine speed indicated by MAX, while the horizontal axis represents eccentricity indicated by POS, i.e., the output of the potentio meter 144. The fully drawn line is indicated by F(POS). These engine speed values are set slightly below allowable engine speed values for operation of the annular disc 40 in varying eccentric conditions. It will be noted from FIG. 14 that the predetermined engine speed value drops in accordance with increasing eccentricity of the annular disc 40.

At box 210 in FIG. 13, the control unit 104 determines the first predetermined value MAX by performing a table look-up operation of FIG. 14 using POS. Then, the control logic goes to box 212 where the control unit 104 determines whether RPM is greater than MAX. If RPM is greater than MAX, the control logic goes to box 158 where flag F/C is set, while, if RPM is equal to or less than MAX the control logic goes to box 156 where the control unit 104 resets flag F/C.

In the preceding description, the support or disc housing 46 is moved by the driver 80 including the stepper motor 80, and the sensor in the form of the potentio meter 144 provides information to the control unit 104. The disc housing 46 can be moved by hydraulic means as shown in FIGS. 15 and 16. In FIG. 15, the sensor is in the form of a limit switch 220.

In FIG. 15, the position of parts when an intermediate member or annular disc 40 operates in concentric condition is fully drawn, while the position of parts when the annular disc 40 is in eccentric condition is drawn by dotted line. The limit switch 220 is arranged such that it is normally turned OFF, but it is turned ON by engagement with a support or disc housing 48 when the annular disc 40 is in eccentric condition.

The hydraulic means includes a hydraulic piston 222 opposed to a spring biased piston 224 which is biased by a spring 226 to hold a handle 56 of the disc housing 48 in contact with the hydraulic piston 222. When there is no supply of hydraulic fluid to a piston chamber 228, the hydraulic piston 222 assumes a retracted position shown in FIGS. 15 and 16 owing to the bias of the spring 226, holding the disc housing 48 and thus annular disc 40 in concentric condition. The hydraulic piston 222 assumes a projected position in response to supply of hydraulic fluid to the piston chamber 228 against the bias of the spring 226, holding the disc housing 48 and the annular disc 40 in eccentric condition and turning the limit switch 220 ON. The supply of hydraulic fluid to and discharge thereof from the piston chamber 228 is conducted by a two-position solenoid valve 230 having a solenoid 232 and a spring 234. Energization or deenergization of the solenoid 232 is responsive to output of a control unit 104. The solenoid valve 230 has a spring set position as illustrated at 236 and a solenoid set position as illustrated at 238. Upon deenergization of the solenoid 232, the spring set position 236 is established. In this position 236, hydraulic fluid is discharged from the piston chamber 228. Upon energization of the solenoid 232, the solenoid set position 238 is established. In this position 238, hydraulic fluid from a pump 240 is supplied to the piston chamber 228. The control strategy is as follows: In response to a concentric command issued by the control unit 104, no electic current is supplied to the solenoid 232 to render same deenergized (OFF) and hydraulic fluid is discharged from the piston chamber 228, allowing the spring 226 to hold the annular disc 40 in concentric condition. In response to an eccentric command, electric current is supplied to the solenoid 232 to render same energized (ON) and hydraulic fluid is supplied to the piston chamber 228, urging the hydraulic piston 222 to move the disc housing 48 against the spring 234 to the position as illustrated by the one-dot chain line in FIG. 16 where the annular disc 40 is in eccentric condition. FIGS. 17, 18 and 19 show flow charts alternative to the flow chart of FIG. 9. The flow charts of FIGS. 17 to 19 illustrate a modified portion of the control strategy of the preferred implementation of the present invention. This modification is needed to fit the control strategy to the driver in the form of hydraulic means illustrated in FIGS. 15 and 16.

Execution of the control routine of FIG. 17 is repeated at regular intervals. At a box 250, the control unit 104 fetches the present command COM. At a box 252, the control unit 104 determines whether the previously stored old command $COM_{OLD}$ is equal to the present command COM. If the present command COM is equal to the old command $COM_{OLD}$ and thus there is no change in command, the control logic goes to a box 254 where the control unit 104 moves the content of the present command COM to the old command $COM_{OLD}$. Then, the control logic returns to a point of START.

If there is a change in command, i.e., a change from the eccentric command to the concentric command or vice versa, an answer to the interrogation at box 252 is negative and the logic flow goes to a box 256 where the control unit 104 moves the content of the present command COM to the old command $COM_{OLD}$. Then, the logic flow goes to a box 258 where the content of a timer T of a timer routine is reset to initiate counting of time by the timer routine. At a box 260, the control unit 104 fetches the content of the timer T. At a box 262, the control unit 104 determines whether the content of timer T is greater than a predetermined period of time of 0.1 second. An answer to the interrogation at box 262 is negative until the content of the timer T exceeds the predetermined period of time. Setting of this predetermined period of time is made in due consideration of a delay between the moment of occurrence of the change in command and the momenmt of completion of a shift between the concentric position and the eccentric position of the disc housing 48. When the counted time T has reached the predetermined period of time, the logic flow goes from box 262 to a box 264 where the control unit 104 checks the present command COM and determines whether the present command COM is the concentric command. If the present command COM is the concentric command, the logic flow goes to a box 266 where the control unit 104 determines whether the limit switch 220 is turned ON. If the limit switch 220 is turned ON, the logic flow goes to a box 268. In box 268, the control unit 104 sets a flag F1 and records that a shift to an operation in concentric condition has failed. After box 268 the logic flow returns to the point of START. If, at box 266, the limit switch 220 is turned OFF, the logic flow goes to a box 270 where the control unit 104 resets the flag F1 before returning to the point of START.

If, at box 264, the present command COM is eccentric command, the logic flow goes to a box 272 where the control unit 104 determines whether the limit switch 220 is turned ON. If the limit switch 222 is turned OFF, the logic flow goes to a box 274 where the control unit 104 sets a flag F2 and records that a shift to an operation in eccentric condtion has failed. After box 274 the logic flow returns to the point of START. If, at box 272, the limit switch 220 is turned ON, the logic flow goes to a box 276 where the control unit 104 resets the flag F2 before returning to the point of START.

Referring to the control routine of FIG. 18, at a box 280, the control unit 104 determines whether flag F1 is set. If flag F1 is not set, the logic flow goes to a box 282 where the control unit 104 resets flag F/C before returning to a point of START. If flag F1 is set, the logic flow goes to a box 284 where the control unit 104 determines the engine speed RPM based on information from the crank angle sensor 122. At a box 286, the control unit 104 determines whether RPM is greater than the first predetermined engine speed of 5000 rpm. If RPM is equal to or less than 5000 rpm, the control logic goes to box 282. If RPM is greater than 5000 rpm, the control logic goes to a box 288 where the control unit 104 sets flag F/C before returning to the point of START.

Referring to the control routine of FIG. 19, at a box 290, the control unit 104 determines whether flag F2 is set. If flag F2 is not set, the logic flow goes to a box 292 where the control unit 104 resets flag F/U before returning to a point of START. If flag F2 is set, the logic flow goes to a box 294 where the control unit 104 determines the engine speed RPM based on information from the crank angle sensor 122 and determines the throttle valve position based on information from the throttle sensor 130. At a box 296, the control unit 104 determines whether RPM is less than the second predetermined engine speed of 1500 rpm. If RPM is greater than or equal to 1500 rpm, the logic flow goes to box 292. If RPM is less than 1500 rpm, the logic flow goes to a box 298 where the control unit 104 determines whether TH is less than the predetermined engine load $\theta_T$. If TH is greater than or equal to $\theta_T$, the logic flow goes to box 292. If TH is less than $\theta_T$, the logic flow goes to a box 300 where the control unit 104 sets flag F/U before returing to the point of START.

FIG. 20 is an alternative to the hydraulic means shown in FIG. 16. The hydraulic means of FIG. 20 is different from that of FIG. 16 in that, when there is no supply to a piston chamber 228, a spring 226 holds a handle 56 to a position corresponding to operation of an annular disc 40 in eccentric condition, and when there is supply of hydraulic fluid to the piston chamber 228, a hydraulic piston 222 holds the handle 56 to a position corresponding to operation of the annular disc 40 in concentric condition.

What is claimed is:

1. A method of controlling an internal combustion engine with a cylinder valve control device including a driver which is operative in response to a first command to condition the cylinder valve control device to open a cylinder valve suitable for engine operation at low speeds, the driver being operative in response to a second command to condition the cylinder valve control device to open the cylinder valve suitable for engine operation at high speeds, the method comprising the steps of:

providing an output distinguishing an operation of the cylinder valve control device conditioned to open the cylinder valve suitable for engine operation at low speeds from an operation of the cylinder valve control device conditioned to open the cylinder valve suitable for engine operation at high speeds; and suspending, responsive to said output, fuel supply to the internal combustion engine upon the engine speed exceeding a predetermined engine speed when said output represents the operation of the cylinder valve control device conditioned to open the cylinder valve suitable for engine operation at low speeds.

2. A system for controlling an internal combustion engine having a cylinder valve, the internal combustion engine being operable on fuel supplied thereto, comprising:

a driving shaft rotatable about a shaft axes;

a cam arranged to actuate the cylinder valve, said cam being rotatable relative to said driving shaft;

a support;

a drive member between said driving shaft and an intermediate member, said drive member being rotatable with said driving shaft and coupled with said intermediate member at a first position spaced from said shaft axis;

a driven member between said intermediate member and said cam, said driven member being rotatable with said cam and coupled with said intermediate member at a second position angularly spaced from said first position with respect to said shaft axis;

said first and said second position being so spaced from said shaft axis that they are at varying distances from a central axis of said intermediate member during operation, each of said drive and said driven members having a movable connection with said intermediate member to permit a variation in its respective distance from said central axis of said intermediate member;

a driver drivingly connected to said support to position said support to establish an eccentric position so that there is an offset between said central axis of said intermediate member and said shaft axis in response to an eccentric command, and to position said support to establish a concentric position so that there is alignment between said central axis of said intermediate member and said shaft axis in response to a concentric command;

an intermediate member condition detecting sensor arranged to detect said offset between said central axis of said intermediate member and said shaft axis and generate an offset signal indicative of the detected offset;

an engine speed detecting sensor arranged to detect an engine speed of the internal combustion engine and generate an engine speed signal indicative of the detected engine speed; and a control unit operatively coupled with said sensors and said driver, said control unit being operative to compare said offset signal with a predetermined offset value and provide a first signal when said offset signal is greater than said predetermined offset value, said control unit being operative to compare said engine speed signal with a predetermined engine speed value and provide a second signal when said engine speed signal is greater than said predetermined engine speed value, said control unit being operative to suspend fuel supply to the internal combustion engine when both said first signal and said second signal are present.

* * * * *